(12) United States Patent
Prevot

(10) Patent No.: US 10,399,402 B2
(45) Date of Patent: Sep. 3, 2019

(54) STRUT ASSEMBLY INCLUDING A BEARING SLEEVE HAVING A RADIAL PROTRUSION

(71) Applicant: BeijingWest Industries Co., Ltd., Beijing (CN)

(72) Inventor: Benoit Prevot, Butry sur Oise (FR)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 31 days.

(21) Appl. No.: 15/607,343

(22) Filed: May 26, 2017

(65) Prior Publication Data

US 2018/0001727 A1    Jan. 4, 2018

Related U.S. Application Data

(60) Provisional application No. 62/356,563, filed on Jun. 30, 2016.

(51) Int. Cl.
*B60G 13/00* (2006.01)
*F16F 9/36* (2006.01)
(Continued)

(52) U.S. Cl.
CPC ............ *B60G 13/008* (2013.01); *B60G 3/01* (2013.01); *B60G 15/07* (2013.01); *B60G 17/04* (2013.01);
(Continued)

(58) Field of Classification Search
CPC ...... F16F 9/369; F16F 9/38; F16F 9/36; F16F 1/3835; F16F 1/3856; F16F 9/3271;
(Continued)

(56) References Cited

U.S. PATENT DOCUMENTS

| 3,194,614 A | 7/1965 | Thomas |
| 3,385,589 A * | 5/1968 | Erdmann ............. B60G 13/005 267/221 |

(Continued)

FOREIGN PATENT DOCUMENTS

WO    9803360    1/1998

OTHER PUBLICATIONS

Extended European Search Report dated Dec. 1, 2017 (Eight Pages).

(Continued)

*Primary Examiner* — Bradley T King
*Assistant Examiner* — James K Hsiao
(74) *Attorney, Agent, or Firm* — William H. Honaker; Dickinson Wright PLLC

(57) ABSTRACT

A strut assembly including a reservoir tube that extends about and along a center axis and has an interior surface and defines a chamber. A bearing sleeve is disposed in the chamber of the reservoir tube and extends about and along the center axis between a proximal end and a distal end. The bearing sleeve presents an inner surface and an outer surface. A damper body tube is disposed in the bearing sleeve and is moveable relative to the bearing sleeve. A piston assembly is disposed in the damper body tube. The outer surface of the bearing sleeve has a tubular portion and a protrusion portion that extends radially outwardly relative to the tubular portion and annularly and providing an interference fit between the outer surface of the bearing sleeve and the interior surface of the reservoir tube.

20 Claims, 3 Drawing Sheets

(51) Int. Cl.
*F16F 9/32* (2006.01)
*B60G 3/01* (2006.01)
*B60G 15/07* (2006.01)
*B60G 17/04* (2006.01)
*F16F 9/38* (2006.01)
*B60G 15/02* (2006.01)
*B60G 15/06* (2006.01)
*B60G 17/02* (2006.01)

(52) U.S. Cl.
CPC ............... *F16F 9/369* (2013.01); *F16F 9/38* (2013.01); *B60G 13/001* (2013.01); *B60G 13/005* (2013.01); *B60G 15/02* (2013.01); *B60G 15/06* (2013.01); *B60G 17/02* (2013.01); *B60G 2204/40* (2013.01); *B60G 2204/418* (2013.01)

(58) Field of Classification Search
CPC ... F16F 9/3235; B60G 13/001; B60G 13/008; B60G 2204/418; B60G 15/06; B60G 15/02; B60G 15/07
USPC ........................................................ 188/322.19
See application file for complete search history.

(56) References Cited

U.S. PATENT DOCUMENTS

| | | | | |
|---|---|---|---|---|
| 3,690,425 | A * | 9/1972 | Willich | B60G 3/01 188/321.11 |
| 3,736,645 | A * | 6/1973 | Fannin | B60R 19/32 29/422 |
| 4,443,926 | A * | 4/1984 | Pearson | B60G 13/001 188/269 |
| 4,633,983 | A | 1/1987 | Horvath et al. | |
| 4,651,398 | A * | 3/1987 | Souther | F16F 9/3271 267/182 |
| 4,828,231 | A * | 5/1989 | Fukumura | F16F 9/088 188/314 |
| 5,042,781 | A * | 8/1991 | Ezure | F16F 9/088 267/64.23 |
| 5,163,706 | A | 11/1992 | Maguran et al. | |
| 5,667,041 | A | 9/1997 | Jensen | |
| 5,984,060 | A * | 11/1999 | Clark | B60G 3/01 188/269 |
| 6,234,461 | B1 * | 5/2001 | Bohm | F16F 9/0245 267/123 |
| 6,378,848 | B1 * | 4/2002 | Uchida | B60M 1/26 267/64.25 |
| 6,606,224 | B2 | 8/2003 | Macpherson et al. | |
| 6,684,990 | B2 * | 2/2004 | Takakusaki | F16F 9/062 188/313 |
| 6,840,358 | B2 | 1/2005 | Miamisburg et al. | |
| 7,021,435 | B2 | 4/2006 | Miamisburg et al. | |
| 8,028,666 | B2 | 10/2011 | Clever et al. | |
| 8,408,569 | B2 | 4/2013 | Keil et al. | |
| 8,434,772 | B2 | 5/2013 | Keil | |
| 2002/0130000 | A1 * | 9/2002 | Lisenker | B60G 13/008 188/267.1 |
| 2002/0130001 | A1 * | 9/2002 | Lisenker | F16F 9/535 188/267.2 |
| 2002/0130002 | A1 | 9/2002 | Hopkins et al. | |
| 2004/0041063 | A1 | 3/2004 | Enders et al. | |
| 2010/0207350 | A1 | 8/2010 | Uchiyama et al. | |
| 2012/0150150 | A1 | 6/2012 | Cai et al. | |
| 2013/0075999 | A1 * | 3/2013 | Toda | B62K 25/08 280/279 |
| 2013/0181415 | A1 | 7/2013 | Henriksson | |
| 2014/0262651 | A1 * | 9/2014 | Luczak | F16F 9/3235 188/297 |

OTHER PUBLICATIONS

First Office Action and search report dated Jan. 31, 2019 for counterpart Chinese patent application No. 201710403613.3, along with machine EN translation downloaded from EPO.

* cited by examiner

… (US 10,399,402 B2)

STRUT ASSEMBLY INCLUDING A BEARING SLEEVE HAVING A RADIAL PROTRUSION

CROSS REFERENCE TO RELATED APPLICATION

This application claims the benefit of U.S. Provisional Patent Application Ser. No. 62/356,563 filed on Jun. 30, 2016, and titled "Strut Assembly Including a Bearing Sleeve Having a Radial Protrusion", the entire disclosure of which is hereby incorporated by reference.

TECHNICAL FIELD

A strut assembly. More particularly, a damper of the monotube strut type for use in vehicle suspension systems for bearing a load and damping vibrations between a body of a vehicle and a wheel assembly of the vehicle.

BACKGROUND OF THE INVENTION

A strut assembly is a type of damper that is commonly used in vehicle suspension systems for bearing a load and damping vibrations between a body and a wheel assembly of the vehicle. One such strut assembly of the monotube type is disclosed in U.S. Pat. No. 5,984,060 which includes a reservoir tube for connection with a wheel assembly of a vehicle. The reservoir tube extends about and along a center axis and has an interior surface and defines a chamber. A bearing sleeve is fixed to the reservoir tube in the chamber of the reservoir tube. The bearing sleeve extends about and along the center axis between a proximal end and a distal end, and presents an inner surface and an outer surface. A damper body tube is further provided for connection with a body of the vehicle. The damper body tube is disposed in the bearing sleeve and is moveable relative to the bearing sleeve along a pair of bearings. A piston assembly is disposed in the damper body tube and is fixed relative to the reservoir tube such that the damper body tube is slideable relative to the piston assembly.

In order to fix the reservoir tube to the bearing sleeve on such monotube strut assemblies, typically, the bearing sleeve is crimped to the reservoir tube. Often, a radially-outwardly extending flare is formed at an end of the bearing sleeve which is crimped to the reservoir tube. A gap is also typically present between the reservoir tube and the bearing sleeve. It has been recognized that the crimping force required to connect the reservoir tube and the bearing sleeve in this manner may vary, thus leading to difficulties in terms of assembly process repeatability. Further, it has been recognized that such a crimped connection can lead to shape variations along the length of the bearing sleeve and/or reservoir tube. Inconsistent shapes of the bearing sleeve and reservoir tube may result in reduced performance of the strut and noise. Accordingly, there remains room for improvements to strut assemblies.

SUMMARY OF THE INVENTION

According to an aspect of the disclosure, a strut assembly is provided that includes a reservoir tube that extends about and along a center axis and has an interior surface and defines a chamber. A bearing sleeve is disposed in the chamber of the reservoir tube and extends about and along the center axis between a proximal end and a distal end. The bearing sleeve presents an inner surface and an outer surface. A damper body tube is disposed in the bearing sleeve and is moveable relative to the bearing sleeve. A piston assembly is disposed in the damper body tube. The outer surface of the bearing sleeve has a tubular portion and a protrusion portion that extends radially outwardly relative to the tubular portion. The protrusion portion provides an interference fit between the outer surface of the bearing sleeve and the interior surface of the reservoir tube.

According to another aspect of the disclosure, a strut assembly for a vehicle is provided that includes a reservoir tube that extends about and along a center axis and has an interior surface and defines a chamber. A bearing sleeve is disposed in the chamber of the reservoir tube and extends about and along the center axis between a proximal end and a distal end. The bearing sleeve presents an inner surface and an outer surface. A damper body tube is disposed in the bearing sleeve and is moveable relative to the bearing sleeve. A piston assembly is disposed in the damper body tube. The bearing sleeve has a tubular portion at which the outer surface is positioned a first radial length from the center axis. Furthermore, the bearing sleeve has a protrusion portion at which the outer surface is positioned at a second radial length from the center axis. The second radial length is greater than the first radial length to provide an interference fit between the outer surface of the bearing sleeve and the interior surface of the reservoir tube.

The invention in its broadest aspect therefore provides for a strut assembly that does not require crimping to connect the reservoir tube and bearing sleeve to one another, thus eliminating issues associated with variable clamping loads such as variations of the shape of the bearing sleeve and/or reservoir tube along their lengths. This further provides improved performance of the strut assembly and reduced noise during operation. Furthermore, a simple process is provided for assembling the strut assembly, as the bearing sleeve only needs to be inserted into the reservoir tube to provide the interference fit between the reservoir tube and the bearing sleeve.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the figures, wherein like numerals indicate corresponding parts throughout the several views, a strut assembly 20 is generally shown for bearing a load and damping vibrations between a body and a wheel assembly of a vehicle. It should be appreciated that the subject strut assembly 20 may be used on various vehicles including, but not limited to, automobiles, recreational vehicles and motorcycles.

Figure 1:
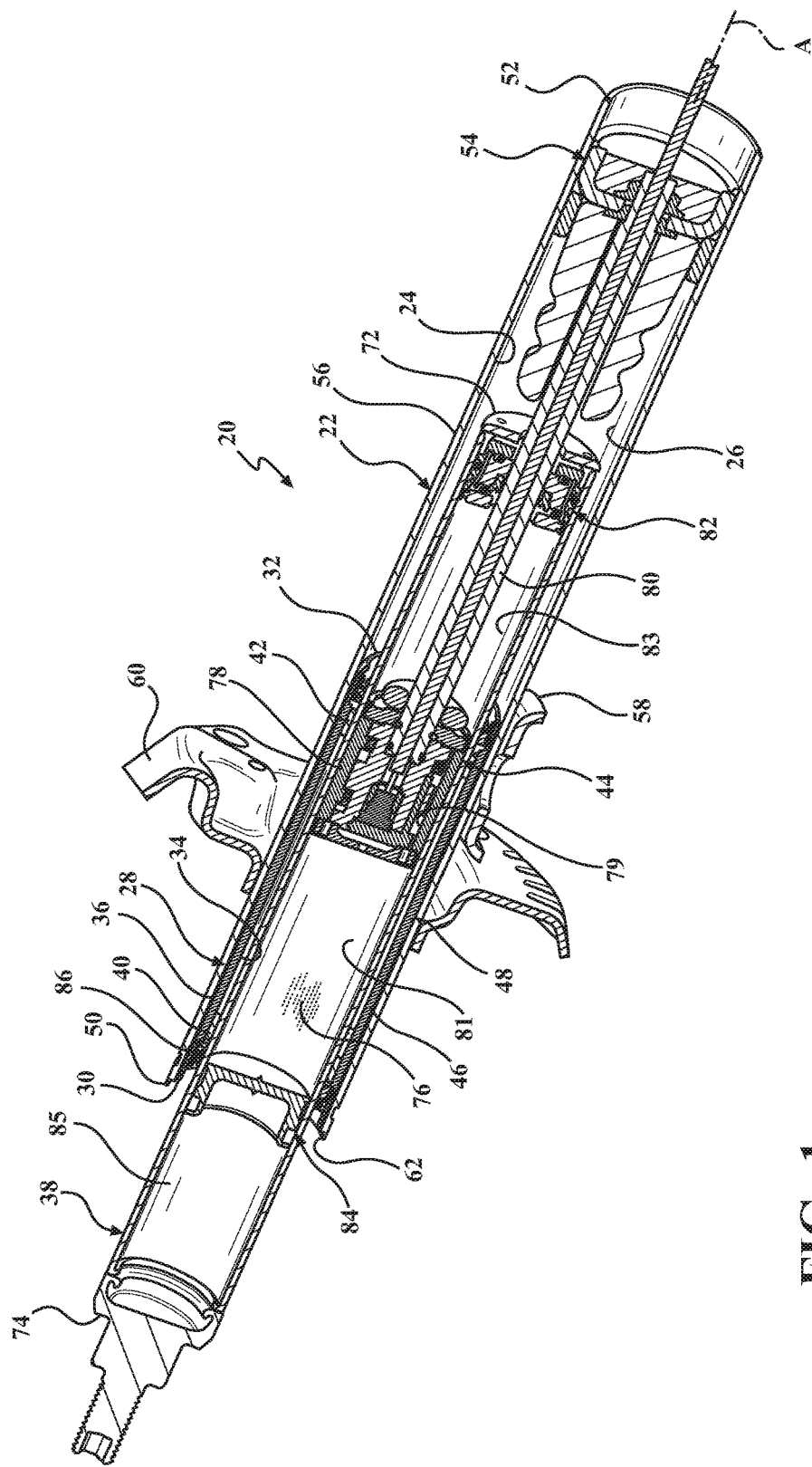
FIG. 1 is a perspective cutaway view of an example embodiment of a strut assembly according to an aspect of the disclosure.

As best presented in FIG. 1, the strut assembly 20 generally includes a reservoir tube 22 for connection with a wheel assembly of a vehicle. The reservoir tube 22 extends about and along a center axis A and has an interior surface 24 and defines a chamber 26. A bearing sleeve 28 is fixed to the reservoir tube 22 in the chamber. The bearing sleeve 28 extends about and along the center axis A between a proximal end 30 and a distal end 32. The bearing sleeve 28 also presents an inner surface 34 and an outer surface 36. A damper body tube 38 is further provided for connection with a body of the vehicle. The damper body tube 38 is disposed in the bearing sleeve 28 and is moveable relative to the bearing sleeve 28 along a pair of bearings 40, 42. A piston assembly 44 is disposed in said damper body tube 38 and is fixed relative to the reservoir tube 22 such that the damper body tube 38 is slideable relative to the piston assembly 44. The outer surface 36 of the bearing sleeve 28 has a tubular portion 46 and a protrusion portion 48 extending radially outwardly relative to the tubular portion 46 and annularly for creating an interference fit between the outer surface 36 of the bearing sleeve 28 and the interior surface 24 of the reservoir tube 22.

More particularly, the reservoir tube 22 extends along the center axis A between a first end 50 that is open and a second end 52 that is closed by a jounce bumper assembly 54. The reservoir tube 22 also has an exterior surface 56 opposite the interior surface 24. A mounting bracket 58 is attached to the exterior surface 56 of the reservoir tube 22 for being connected with a steering knuckle of the wheel assembly of the vehicle. Further, a spring seat 60 is attached to the exterior surface 56 of the reservoir tube 22. As best illustrated in FIG. 2, the interior surface 24 of the reservoir tube 22 defines a first step 62 that extends radially inwardly at the first end 50.

Figure 2:
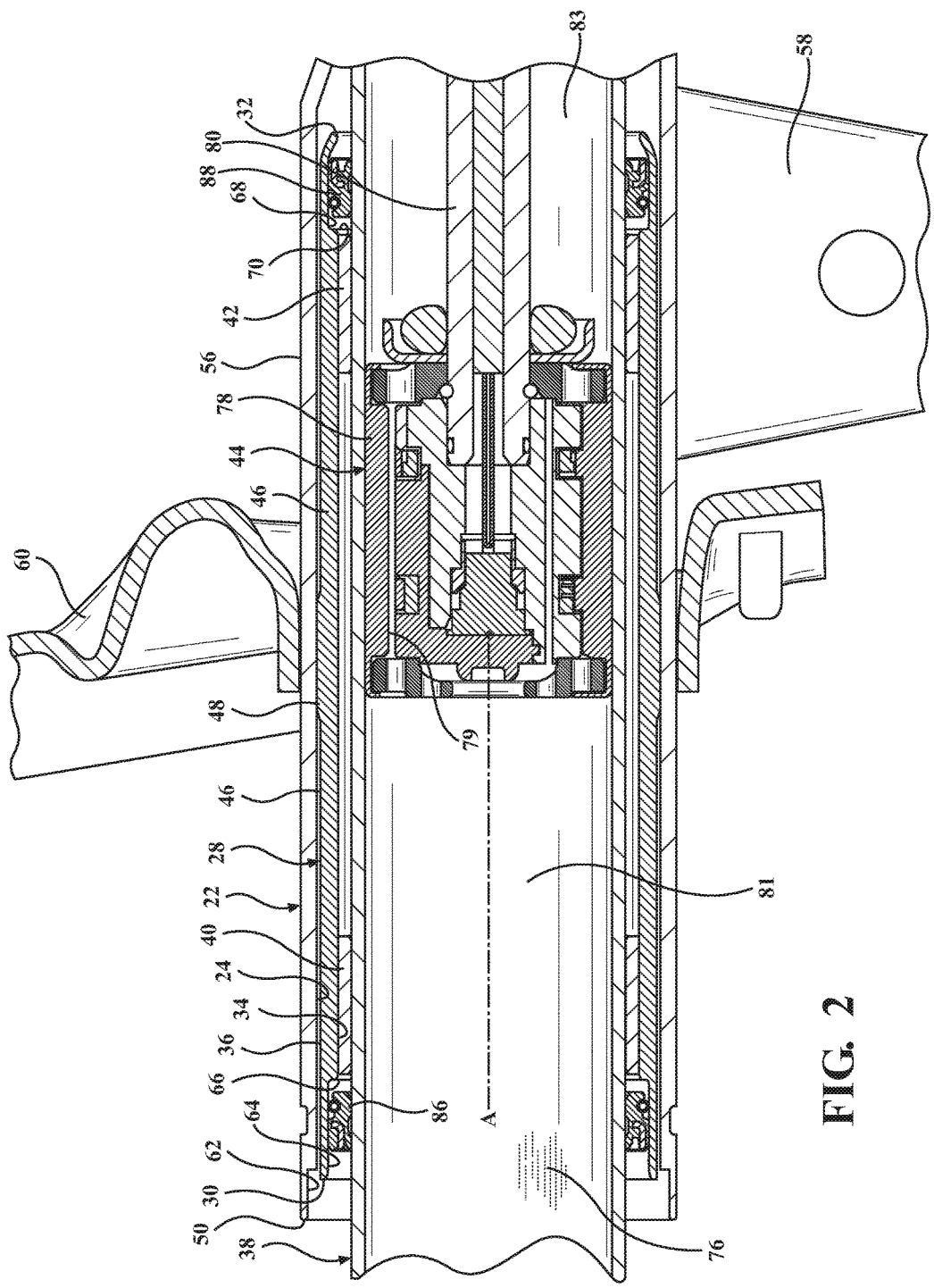
FIG. 2 is a side magnified view of the strut assembly of FIG. 1, illustrating the interface between a reservoir tube and a bearing sleeve.

With continued reference to FIG. 2, the inner surface 34 of the bearing sleeve 28 defines a proximal indentation 64 that extends radially therein at the proximal end 30 to define an annular proximal step 66. The inner surface 34 of the bearing sleeve 28 further defines a distal indentation 68 that extends radially therein at the distal end 32 to define an annular distal step 70. The proximal end 30 of the bearing sleeve 28 is spaced axially from the first end 50 of the reservoir tube 22. Further, the bearing sleeve 28 curled radially inwardly at the distal end 32.

As best illustrated in FIG. 1, the damper body tube 38 is disposed in the bearing sleeve 28 and is axially moveable relative to the bearing sleeve 28. The damper body tube 38 extends between a lower end 72 and an upper end 74 that may be connected with the body of the vehicle, thus providing axial movement of the damper body tube 38 with the body of the vehicle. A hydraulic fluid 76 is disposed in the damper body tube 38.

As best illustrated in FIG. 2, the pair of bearings 40, 42 includes a first bearing 40 that is disposed radially between the bearing sleeve 28 and the damper body tube 38 axially adjacent to the proximal end 30 of the bearing sleeve 28. Further, a second bearing 42 is disposed radially between the bearing sleeve 28 and the damper body tube 38, axially spaced from the first bearing 40 and adjacent to the distal end 32 of the bearing sleeve 28. The first and second bearings 40, 42 allow axial movement of the damper body tube 38 relative to the bearing sleeve 28.

As best shown in FIG. 1, the piston assembly 44 is slideably disposed in the damper body tube 38. The piston assembly 44 generally includes a piston 78 and a piston rod 80 that extends axially from the piston 78. The piston 78 separates the interior of the damper body tube 38 into a compression chamber 81 between the upper end 74 of the damper body tube 38 and the piston 78, and a rebound chamber 83 between the lower end 72 of the damper body tube 38 and the piston 78. The piston assembly 44 is fixed relative to the reservoir tube 22, and thus the damper body tube 38 slides relative to the piston assembly 44. The piston 78 defines at least one passage 79 for allowing the fluid 76 to pass therethrough during movement of the damper body tube 38 relative to the reservoir tube 22.

A rod guide assembly 82 is disposed in the damper body tube 38 adjacent to the lower end 72 and about the piston rod 80 for guiding the piston rod 80 axially during movement of the damper body tube 38 relative to the piston 78.

Further, a gas cup 84 is slideably disposed in the damper body tube 38 between the upper end 74 of the damper body tube 38 and the piston 78 and separates out a compensation chamber 85 from the compression chamber 26. A compressible gas is disposed in the compensation chamber 81. During axial movement of the damper body tube 38 relative to the piston assembly 44 and reservoir tube 22, a decreasing or an increasing volume of the piston rod 80 is contained within the rebound chamber 83. In order to compensate for this varying volumetric amount of the piston rod 80 within the rebound chamber 83, the gas cup 84 slides axially to compress or expand the compensation chamber 85.

As best shown in FIG. 2, a first seal 86 is disposed between the damper body tube 38 and the bearing sleeve 28 in the proximal indentation 64, adjacent to the proximal step 66. Likewise, a second seal 88 is disposed between the damper body tube 38 and the bearing sleeve 28 in the distal indentation 68, adjacent to the distal step 70. The first and second seals 86, 88 prevent fluid from passing between the bearing sleeve 28 and the damper body tube 38.

Figure 3:
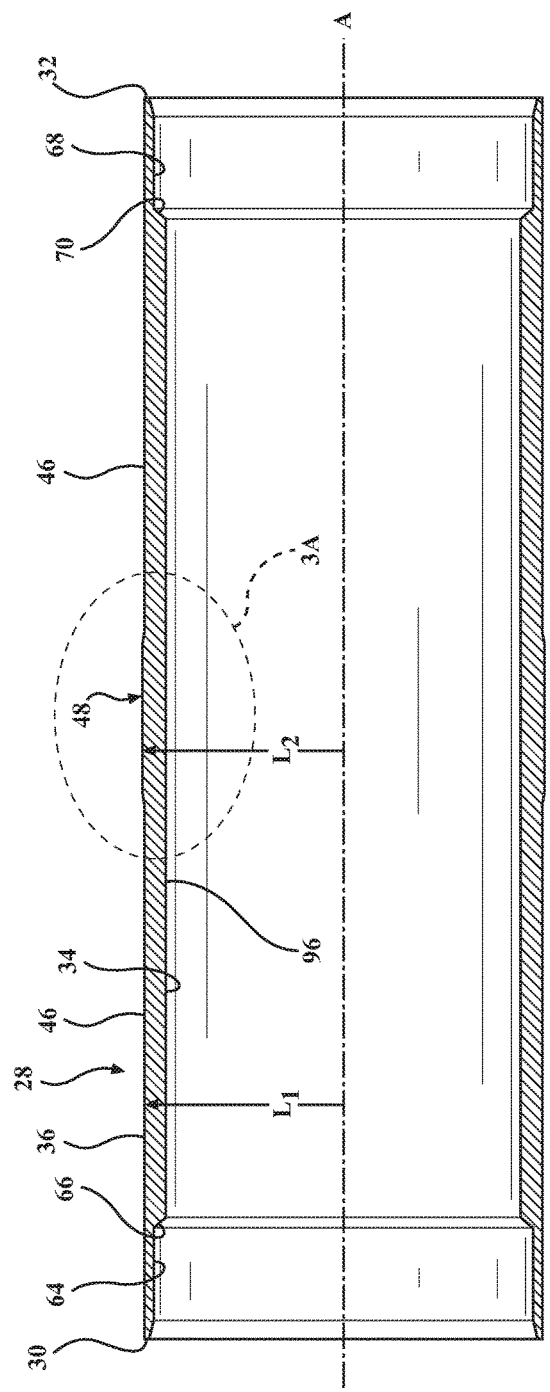
FIG. 3 is a side view of a bearing sleeve according to an aspect of the disclosure.
Figure 3A:
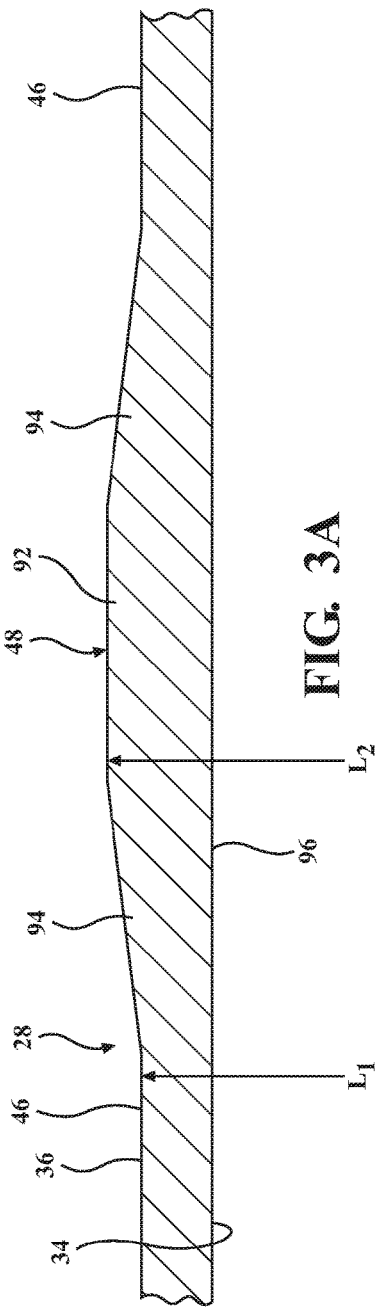
FIG. 3A is a magnified view of a protrusion portion and tubular portion of the bearing sleeve of FIG. 3.

As best illustrated in FIG. 3-3A, the bearing sleeve 28 has a tubular portion 46 and a protrusion portion 48. More specifically, at the tubular portion 46, the outer surface 36 of the bearing sleeve 28 is positioned a first radial length $L_1$ from the center axis A, whereas at the protrusion portion 48, the outer surface 36 is positioned at a second radial length $L_2$ from the center axis A that is greater than the first radial length $L_1$. It should be appreciated that the protrusion portion 48 may have various shapes, and thus may have additional radial lengths across its surface (as shown in the figures). Since the protrusion portion 48 extends further than the tubular portion 46 in the radial direction, it provides an interference fit between the tubular portion 46 of the outer surface 36 of the bearing sleeve 28 and the interior surface 24 of the reservoir tube 22 to immobilize the bearing sleeve 28 relative to the reservoir tube 22. It should be appreciated that the outer surface 36 of the bearing sleeve 28 may extend substantially parallel to the center axis A across its length. As used herein, the term "substantially" may include minor imperfections therealong.

According to an aspect of the disclosure, the protrusion portion 48 may extend continuously and annularly about the center axis A to ensure that the protrusion portion 48 consistently contacts the interior surface 24 of the damper body tube 22. It should be appreciated, however, that a plurality of protrusion portions 48 could alternatively be disposed about the center axis A in circumferentially spaced relationship with one another. Furthermore, as illustrated in the figures, the protrusion portion 48 may be disposed at a single axial location; however, it should be appreciated that alternatively a plurality of protrusion portions 48 could be positioned in axially spaced relationship with one another.

According to yet another aspect of the disclosure, as best illustrated in FIG. 3A, the protrusion portion 48 may have a crest 92 that extends tubularly, and a pair of slope portions 94 on opposing sides of the crest 92 that are tapered. Further, the tubular portion 46 may be defined on both sides of the protrusion portion 48.

As best illustrated in FIG. 2, the first and second bearings 40, 42 are axially spaced from one another far enough such that the protrusion portion 48 is disposed axially between the first and second bearings 40, 42. It should be appreciated that since the bearings 40, 42 are sufficiently spaced from the protrusion portion 48, no deformation on the bearings 40, 42 results once the bearing sleeve 28 has been inserted into the reservoir tube 22 and the interference fit between the reservoir tube 22 and bearing sleeve 28 is provided. It should further be appreciated that in an embodiment which includes multiple axially spaced protrusions, all of the protrusion portions 48 should be disposed axially between the bearings 40, 42.

As best shown in FIG. 3, the inner surface 34 of the bearing sleeve 28 has a central portion 96 between the proximal and distal indentations 64, 68 (overlapping the protrusion portion 48 axially) that has a substantially constant diameter, thereby ensuring that the bearings 40, 42 are disposed flush against the inner surface 34.

It should be appreciated that because the protrusion portion 48 provides the interference fit between the reservoir tube 22 and bearing sleeve 28, the subject strut assembly 20 does not require crimping to connect the reservoir tube 22 and bearing sleeve 28 to one another. As such, issues associated with variable clamping loads such as variations of the shape of the bearing sleeve 28 and/or reservoir tube 22 along their lengths are eliminated. This may further provide improved performance of the strut assembly 20 and reduced noise during operation. According to yet another aspect of the disclosure, a simple process is provided for assembling the strut assembly 20, as the bearing sleeve 28 only needs to be inserted into the reservoir tube 22 to provide the interference fit between the reservoir tube 22 and the bearing sleeve 28.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A strut assembly including:
   a reservoir tube extending about and along a center axis and having an interior surface and defining a chamber;
   a bearing sleeve disposed in said chamber of said reservoir tube and extending about and along said center axis between a proximal end and a distal end and presenting an inner surface and an outer surface;
   a damper body tube disposed in said bearing sleeve and moveable relative to said bearing sleeve;
   a piston assembly disposed in said damper body tube;
   said outer surface of said bearing sleeve having a tubular portion and a protrusion portion extending radially outwardly relative to said tubular portion and frictionally engaging said interior surface of said reservoir tube to define an interference fit connection between said protrusion portion of said outer surface of said bearing sleeve and said interior surface of said reservoir tube.

2. The strut assembly as set forth in claim 1 wherein said protrusion portion extends continuously and annularly about said center axis.

3. The strut assembly as set forth in claim 1 wherein at least one bearing is disposed radially between said bearing sleeve and said damper body tube for allowing axial movement of said damper body tube relative to said bearing sleeve and wherein said protrusion portion is spaced axially from said at least one bearing.

4. The strut assembly as set forth in claim 3 wherein said at least one bearing includes a first bearing and a second bearing disposed in axially spaced relationship with one another and wherein said protrusion portion is disposed axially between said first and second bearings.

5. The strut assembly as set forth in claim 4 wherein said first bearing is disposed axially adjacent to said proximal end of said bearing sleeve.

6. The strut assembly as set forth in claim 4 wherein said second bearing is disposed axially adjacent to said distal end of said bearing sleeve.

7. The strut assembly as set forth in claim 1 wherein said inner surface of said bearing sleeve has a central portion having a substantially constant diameter and axially aligned with said protrusion portion.

8. The strut assembly as set forth in claim 1 wherein said protrusion portion has a crest being tubular and a pair of slope portions on opposing sides of said crest being tapered and extending to said tubular portion.

9. The strut assembly as set forth in claim 1 wherein said inner surface of said bearing sleeve defines a proximal indentation extending radially therein at said proximal end to define a an annular proximal step, wherein a first seal disposed between said damper body tube and said bearing sleeve in said proximal indentation adjacent to said proximal step for preventing fluid from passing between said bearing sleeve and said damper body tube during movement of said damper body tube.

10. The strut assembly as set forth in claim 1 wherein said inner surface of said bearing sleeve defines a distal indentation extending radially therein at said distal end to define an annular distal step, and wherein a second seal is disposed between said damper body tube and said bearing sleeve in said distal indentation adjacent to said distal step for preventing fluid from passing between said bearing sleeve and said damper body tube during movement of said damper body tube.

11. The strut assembly as set forth in claim 1 wherein no threaded connection is defined between said protrusion portion of said bearing sleeve and said interior surface of said reservoir tube.

12. The strut assembly as set forth in claim 1 wherein said interior surface of said reservoir tube has a constant radius along a portion of said interior surface of said reservoir tube that overlies an axial length of said protrusion portion of said bearing sleeve.

13. A strut assembly for a vehicle, said strut assembly including:
   a reservoir tube extending about and along an center axis and having an interior surface and defining a chamber;
   a bearing sleeve disposed in said chamber of said reservoir tube and extending about and along said center axis between a proximal end and a distal end and presenting an inner surface and an outer surface;
   a damper body tube disposed in said bearing sleeve and moveable relative to said bearing sleeve;
   a piston assembly disposed in said damper body tube; and said bearing sleeve having a tubular portion at which said outer surface is positioned a first radial length from said center axis, wherein said bearing sleeve has a protrusion portion at which said outer surface is positioned at a second radial length from said center axis, and wherein said second radial length is greater than said first radial length, and wherein said protrusion portion frictionally enages said interior surface of said reservoir tube to define an interference fit between said protrusion portion of said outer surface of said bearing sleeve and said interior surface of said reservoir tube.

14. The strut assembly as set forth in claim 13 wherein said protrusion portion extends annularly about said center axis.

15. The strut assembly as set forth in claim 13 wherein at least one bearing is disposed radially between said bearing sleeve and said damper body tube for allowing axial movement of said damper body tube relative to said bearing sleeve and wherein said protrusion portion is spaced axially from said at least one bearing.

16. The strut assembly as set forth in claim 15 wherein said at least one bearing includes a first bearing and a second bearing disposed in axially spaced relationship with one another and wherein said protrusion portion is disposed axially between said first and second bearings.

17. The strut assembly as set forth in claim 16 wherein said first bearing is disposed axially adjacent to said proximal end of said bearing sleeve.

18. The strut assembly as set forth in claim 16 wherein said second bearing is disposed axially adjacent to said distal end of said bearing sleeve.

19. The strut assembly as set forth in claim 13 wherein said inner surface of said bearing sleeve has a central portion having a substantially constant diameter and axially aligned with said protrusion portion.

20. A strut assembly including:

a reservoir tube extending about and along a center axis and having an interior surface and defining a chamber;

a bearing sleeve disposed in said chamber of said reservoir tube and extending about and along said center axis between a proximal end and a distal end and presenting an inner surface and an outer surface;

a damper body tube disposed in said bearing sleeve and moveable relative to said bearing sleeve;

a piston assembly disposed in said damper body tube; and said outer surface of said bearing sleeve having a tubular portion and a protrusion portion extending radially outwardly relative to said tubular portion and providing an interference fit between said outer surface of said bearing sleeve and said interior surface of said reservoir tube;

wherein said inner surface of said bearing sleeve has a central portion having a substantially constant diameter and being axially aligned with said protrusion portion;

wherein at least one bearing is disposed radially between said bearing sleeve and said damper body tube for allowing axial movement of said damper body tube relative to said bearing sleeve;

wherein said at least one bearing includes a first bearing and a second bearing disposed in axially spaced relationship with one another, wherein said protrusion portion is disposed axially between said first and second bearings, and wherein said protrusion portion is spaced axially from both said first bearing and said second bearing.

* * * * *